United States Patent
Gaborel et al.

(10) Patent No.: US 8,464,680 B2
(45) Date of Patent: Jun. 18, 2013

(54) DISENGAGEABLE MODULE FOR A SYSTEM FOR TRANSMITTING A STARTING TORQUE TO AN INTERNAL COMBUSTION ENGINE

(75) Inventors: Jean-Philippe Gaborel, Ruffey-sur-Seille (FR); Pierre-Julien Barraud, Avermes (FR); Gwenaël Hingouet, Saint-Cyr-sur-Loire (FR); Virginie Hamada, Tours (FR)

(73) Assignee: Aktiebolaget SKF, Göteborg (SE)

( * ) Notice: Subject to any disclaimer, the term of this patent is extended or adjusted under 35 U.S.C. 154(b) by 347 days.

(21) Appl. No.: 12/739,249

(22) PCT Filed: Oct. 14, 2008

(86) PCT No.: PCT/EP2008/063791
§ 371 (c)(1),
(2), (4) Date: Nov. 16, 2010

(87) PCT Pub. No.: WO2009/053276
PCT Pub. Date: Apr. 30, 2009

(65) Prior Publication Data
US 2011/0048358 A1    Mar. 3, 2011

(30) Foreign Application Priority Data
Oct. 22, 2007   (FR) ..................... 07 58455

(51) Int. Cl.
*F02N 11/00*   (2006.01)
*F02N 11/02*   (2006.01)

(52) U.S. Cl.
USPC ..................................... 123/179.25

(58) Field of Classification Search
USPC  123/179.25, 179.1, 179.24, 179.28; 475/267;
192/41 A; 226/13, 61; 74/7 C
See application file for complete search history.

(56) References Cited

U.S. PATENT DOCUMENTS
5,570,766 A   11/1996 Sato et al.
5,671,836 A   9/1997 Shirataki et al.
(Continued)

FOREIGN PATENT DOCUMENTS
EP   1439305 A2   7/2004
EP   1748181 A2   1/2007
(Continued)

*Primary Examiner* — Mahmoud Gimie
(74) *Attorney, Agent, or Firm* — Mark A. Ussai; Bryan Peckjian

(57) ABSTRACT

The disengageable module for a system for transmitting a starting torque to an internal combustion engine, of the type comprising a ring gear connected to the crankshaft of the combustion engine, comprises an inner ring (26) intended to be coupled to the crankshaft, an outer ring (28) intended to be coupled to the ring gear, and at least one free wheel (30) provided with a plurality of wedging elements (34) mounted between raceways of the said rings. It further comprises means (50) designed to provide relative centering of the inner ring (26) and of the outer ring (28) and for transmitting radial load, the said means (50) being mounted at least partially between the inner ring and the outer ring leaving radial clearances between themselves and the said inner ring.

18 Claims, 4 Drawing Sheets

U.S. PATENT DOCUMENTS

| | | | |
|---|---|---|---|
| 5,687,826 A * | 11/1997 | Kinoshita et al. | 192/113.32 |
| 5,966,985 A | 10/1999 | Shuto et al. | |
| 6,161,668 A | 12/2000 | Le Calve et al. | |
| 6,167,998 B1 | 1/2001 | Kinoshita | |
| 2004/0020738 A1 | 2/2004 | Yamamoto | |
| 2007/0034030 A1 * | 2/2007 | Suzuki et al. | 74/6 |
| 2008/0223156 A1 * | 9/2008 | Suzuki et al. | 74/9 |
| 2009/0165593 A1 * | 7/2009 | Shiba et al. | 74/7 C |

FOREIGN PATENT DOCUMENTS

| | | |
|---|---|---|
| FR | 2760057 A1 | 8/1998 |
| JP | 60104818 A | 6/1985 |
| JP | 2003214528 A | 7/2003 |
| WO | WO2007012946 A1 | 2/2007 |

\* cited by examiner

DISENGAGEABLE MODULE FOR A SYSTEM FOR TRANSMITTING A STARTING TORQUE TO AN INTERNAL COMBUSTION ENGINE

BACKGROUND OF THE INVENTION

The present invention relates to the field of systems for transmitting a starting torque to an internal combustion engine, particularly one belonging to a motor vehicle.

Transmission systems such as this are known per se and generally comprise an electric starter motor engaging a toothed ring gear which, in turn, drives the internal combustion engine crankshaft via a free wheel or one way clutch. The free wheel allows a torque to be transmitted temporarily between the electric starter motor and the internal combustion engine as long as the engine has not started, and allows these two to be uncoupled once the combustion engine has started.

For fuller detail on transmission systems such as this, reference may, for example, be made to document EP-A2 1 748 181 or WO-A1-2007/012946.

The transmission systems described in these documents have the particular disadvantage of comprising a high number of components that have to be fitted by the engine manufacturer between the ring gear and the crankshaft. Furthermore, these systems are relatively bulky, particularly in the radial direction.

SUMMARY OF THE INVENTION

It is therefore an object of the present invention to alleviate these disadvantages. More specifically, it is an object of the present invention to provide a disengageable module for a system for transmitting a starting torque to an internal combustion engine that is easy to transport, to handle and to fit.

It is a further object of the present invention to provide a module that is particularly compact.

The disengageable module for a system for transmitting a starting torque to an internal combustion engine, of the type comprising a ring gear connected to the crankshaft of the combustion engine, comprises an inner ring intended to be coupled to the crankshaft, an outer ring intended to be coupled to the ring gear, and at least one free wheel provided with a plurality of wedging elements mounted between the raceways of the said rings. The module further comprises means designed to provide relative centring of the inner ring and of the outer ring and for transmitting radial load between the said rings, the said means being mounted at least partially between the inner ring and the outer ring. These means leave radial clearances, for example of the order of one millimetre, between themselves and the said inner ring.

This then yields a module which has, directly between the inner ring coupled to the ring gear and the outer ring coupled to the crankshaft, means that not only provide the relative centring of the said rings but also transmit radial load.

These centring and radial-load-transmitting means are separate from the wedging elements of the free wheel and from the associated cage designed to ensure the uniform circumferential spacing thereof. Each means leaves, between itself and the inner ring, a radial clearance and at the same time provides relative centring of the inner and outer rings and transmits radial load between these rings.

In one embodiment, the means comprise at least one plain bearing positioned radially between the raceways of the inner ring and of the outer ring. For preference, the said means are mounted axially on each side of the wedging elements.

In one embodiment, the module comprises axial-retention means for axially retaining the inner ring relative to the outer ring. The axial-retention means may comprise washers fixed to seating faces of one of the rings. Advantageously, they also comprise shoulders formed on the other ring facing the washers.

In one embodiment, the wedging elements are cams.

For preference, the module comprises a cage for maintaining a circumferential spacing between the wedging elements. The means designed to provide relative centring of the inner ring and of the outer ring and to transmit radial load between the said rings are separate from the spacing cage.

In one embodiment, at least one seal is positioned radially between seating faces of the inner ring and of the outer ring.

The inner ring and/or the outer ring may comprise at least one lubricant-feed duct.

A further subject of the invention is a system for transmitting a starting torque to an internal combustion engine, particularly one belonging to a motor vehicle, comprising a starter motor, a ring gear connected to the starter motor and to the crankshaft of the internal combustion engine, and a disengageable module as defined herein above.

The disengageable module may be lubricated with grease with which it is packed from the outset, or alternatively may be lubricated with internal combustion engine oil, the said module being at least partially positioned in a recess of the crankcase.

The disengageable module comprises at least one seal positioned between the crankcase and the said module and at least one seal positioned between the outer ring and the inner ring of the module.

BRIEF DESCRIPTION OF THE SEVERAL VIEWS OF THE DRAWINGS

The present invention will be better understood from reading the detailed description of some embodiments taken by way of non-limiting examples and illustrated by the attached drawings in which.

DETAILED DESCRIPTION OF THE INVENTION

Figure 1:
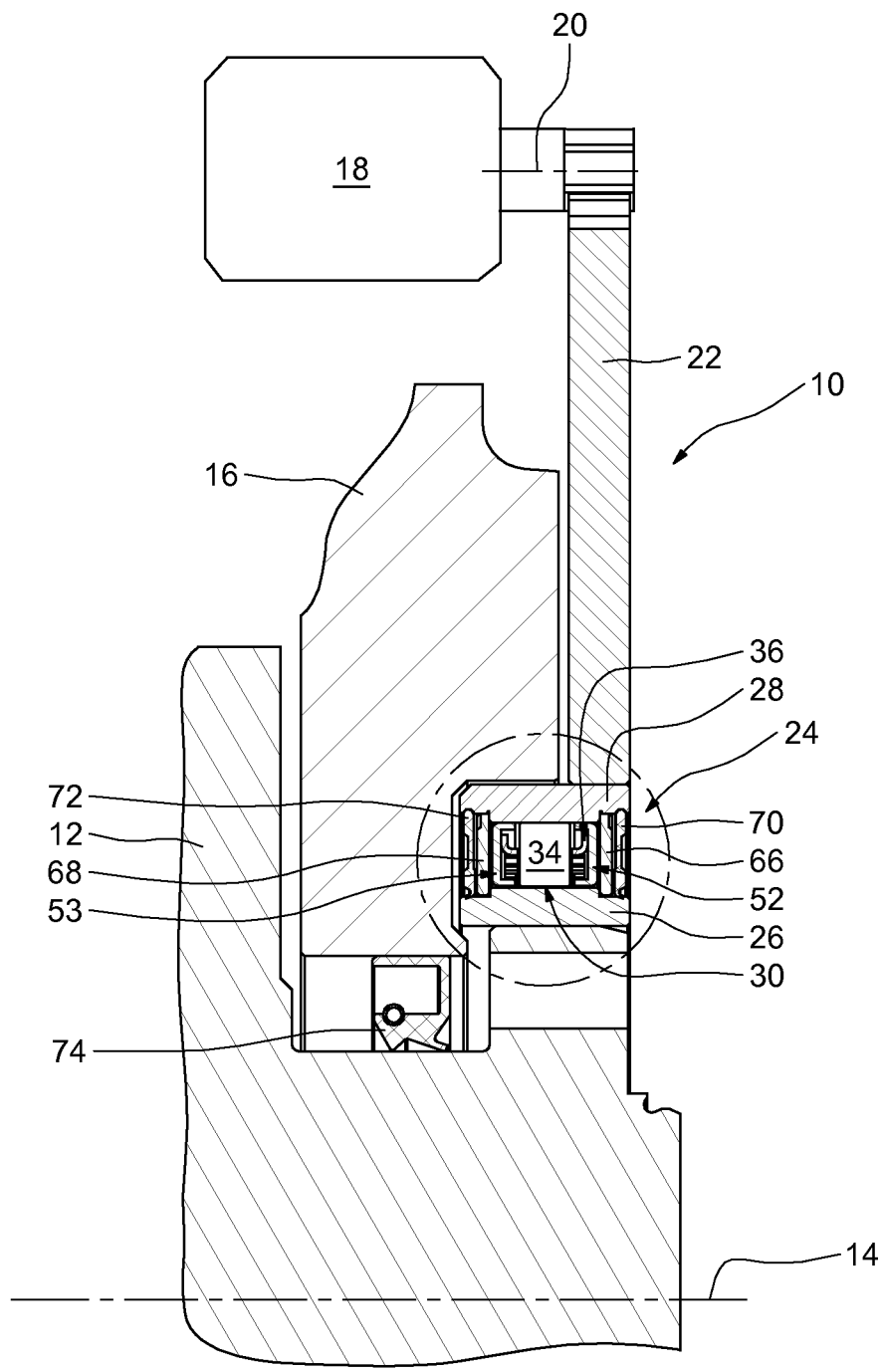
FIG. 1 is a part sectional view of a system for transmitting a starting torque according to a first embodiment of the invention.

FIG. 1 depicts a system 10 for transmitting a torque to an internal combustion engine provided with a crankshaft 12 rotated about an axis 14 inside a crankcase 16.

The system 10 mainly comprises an electric starter motor 18, of axis 20 parallel to the axis 14, a ring gear 22 in mesh with a shaft of the motor 18 and designed to turn the crankshaft 12, and a disengageable module 24 positioned radially between the said crankshaft and the ring gear 22.

Figure 2:
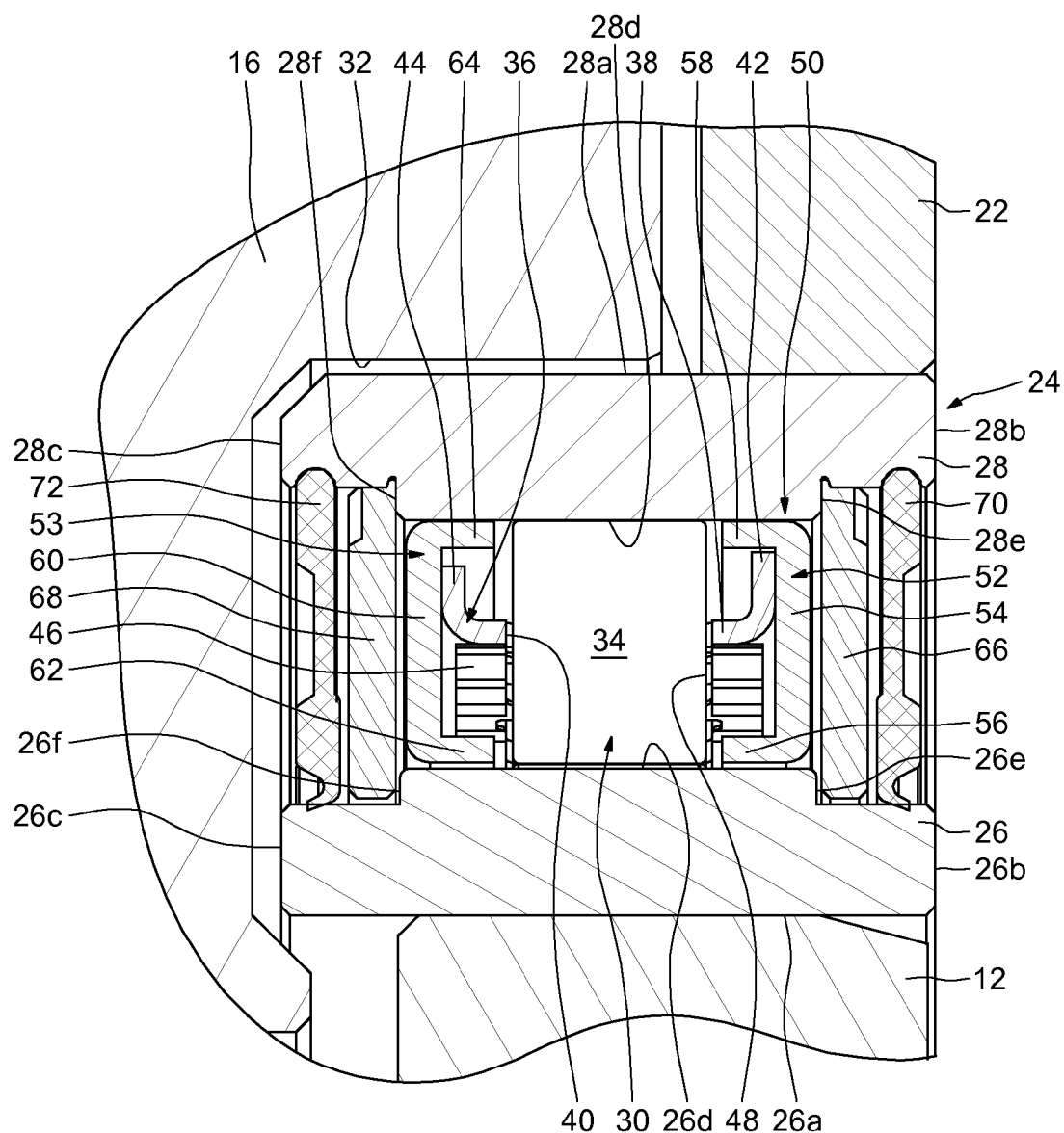
FIG. 2 is a detail of the system of FIG. 1.

As illustrated more clearly in FIG. 2, the disengageable module 24 in particular comprises an inner ring 26, an outer ring 28 and a free wheel or one way clutch 30 housed between the rings. The inner ring 26 has a bore 26a of cylindrical shape, pushed onto the crankshaft 12, and delimited by two radial lateral surfaces 26b and 26c, and a stepped outer cylindrical surface 26d.

The outer ring 28 comprises an outer cylindrical surface 28a which is coupled to the ring gear 22, as a tight fit, and delimited by opposing frontal surfaces 28b and 28c and a stepped bore 28d of cylindrical shape. The radial surfaces 26b, 26c lie respectively in the same radial plane as the radial surfaces 28b, 28c. The bore 28d here comprises two annular grooves (unreferenced) that are symmetric with one another with respect to a radial mid-plane of the inner 26 and outer 28 rings. The grooves are positioned near the frontal surfaces 28c and 28d. The rings 26, 28 here are positioned partially inside a recess 32 of the crankcase 16.

The inner 26 and outer 28 rings are of the solid type. What a "solid-type ring" means is a ring the shape of which is obtained by machining with the removal of chips (turning, grinding) from tube stock, bar stock, or forged and/or rolled rough forms.

The free wheel 30 comprises a plurality of wedging elements 34 or cams positioned between two raceways of the inner 26 and outer 28 rings. The raceways of the said rings are formed by the cylindrical outer surface 26d and by the bore 28d. The said outer surface 26d and the bore 28d therefore respectively constitute inner and outer seating faces for the cams 34. The cams 34 may be of the "engaging" type, that is to say of a type which, under the effect of centrifugal forces as the free wheel 30 rotates, have a tendency to pivot in the direction that encourages them to become wedged between the two raceways of the inner 26 and outer 28 rings.

The free wheel 30 also comprises a cage 36 of annular overall shape for maintaining a uniform circumferential spacing of the cams 34. The cage 36 may be made of a metallic material, particularly of steel, or alternatively may be made of a synthetic material such as polyamide. The cage 36 is positioned radially and axially entirely between the rings 26, 28. It comprises an axial portion 38 provided with a plurality of apertures 40 that form housings for the cams 34. The apertures 40 are uniformly spaced relative to one another in the circumferential direction. The cage 36 also comprises radial portions 42, 44 each extending an axial end of the axial portion 38 outwards towards the bore 28d of the outer ring 28. The radial portion 44 is of a dimension slightly smaller than that of the radial portion 42. The free ends of the said radial portions 42, 44 are situated near the bore 28d of the outer ring 28. In other words, the radial portions 42, 44 remain at some distance from the said bore 28d.

The free wheel 30 also comprises a spring 46 which is produced in the form of an annular metal strip coiled on itself and connected end to end, or with partial overlap of the ends. The spring 46 is mounted inside the cage 36, and more specifically is positioned radially between the outer surface 26d of the inner ring 26 and the axial portion 38 of the cage 36. The spring 46 is situated axially between the radial portions 42 and 44 of the said cage. The spring 46 has pockets or apertures 48 which correspond to those of the cage 36 so that the cams 34 can be fitted. Thus, the apertures 48 are uniformly circumferentially spaced. The spring 36 applies to each of the cams 34 a return force that tends to maintain permanent contact between these cams and the raceways of the inner 26 and outer 28 rings.

The disengageable module 24 further comprises means 50 designed to provide the relative radial centring of the inner ring 26 and of the outer ring 28 and to transmit radial load between these rings. The said means 50 comprise bearings 52, 53 positioned radially between the outer surface 26d of the inner ring 26 and the bore 28d of the outer ring 28 and mounted axially completely between the said rings. The bearings 52, 53 are positioned symmetrically with respect to a radial plane that passes through the centre of the cams 34.

The bearing 52, which is of annular overall shape, may be made of a metallic material, particularly of steel. The bearing 52 comprises a radial portion 54 against which the radial portion 42 of the cage 36 is mounted resting axially, and which is extended at each radial end by axial portions 56, 58. The axial portions 56, 58 extend towards the cams 34, but remain some distance therefrom. The external axial portion 58 rests against the bore 28d of the outer ring 28. The internal axial portion 56 is centred around the outer surface 26d of the inner ring 26. The bearing 52 is a sliding fit on that part of the inner 26 and outer 28 rings that forms the raceways for the cams 34. The bearing 52 could also be mounted as a tight fit on one of the inner 26 or outer 28 rings and mounted as a sliding fit on the other ring. Similarly, the bearing 53 has a radial portion 60 in contact with the radial portion 44 of the cage 36 and extended at its small-diameter and large-diameter free ends by axial portions 62, 64, respectively. The axial portion rests against the bore 28d, the radial portion 62 for its part lying some small radial distance away from the outer surface 26d.

The bearings 52, 53 form journal or plain bearings mounted as a sliding fit on the inner 26 and outer 28 rings, fitted axially on each side of the cams 34, and resting against the cage 36. The cage 36, the spring 46 and the cams 34 are positioned axially between the bearings 52, 53. The plain bearings 52, 53 form rigid means capable both of transmitting radial load between the rings 26 and 28 and of correctly centring these rings particularly by virtue of the fact that there are small radial clearances between the inner ring 26 and the radial portions 56 and 62 of the said bearings.

The disengageable module 24 also comprises retaining washers 66, 68 fixed to the outer ring 28, for example by push-fitting and clenching. The retaining washers 66, 68 are symmetric with respect to the radial plane that passes through the centre of the cams 34. The retaining washer 66 is mounted tightly in the outer ring 28 and rests axially against a radial shoulder 28e formed on the bore 28d of the outer ring 28. The retaining washer 66 in this instance is fixed to the outer ring 28 by clenching. Clenching is performed by localized plastic deformation of material using a punch, upsetting the said material outwards into a groove (unreferenced) in the outer ring 28. In terms of the inner ring 26, the retaining washer 66 faces a shoulder 26e formed on the outer surface 26d. The shoulders 28e and 26e lie in one and the same radial plane. There is an axial clearance between the shoulder 26e of the inner ring 26 and the retaining washer 66. There is also a radial clearance between the said ring and a bore belonging to the retaining washer 66.

In the same way, the retaining washer 68 is fixed to the outer ring 28 by clenching and rests against a shoulder 28f of the said ring. In terms of the inner ring 26, the retaining washer 68 lies some distance from a shoulder 26f which is positioned in the same radial plane as the shoulder 28f. There are small axial and radial clearances between the retaining washer 68 and the inner ring 26. The shoulders 26f, 28f are symmetric with the shoulders 26e, 28e with respect to the radial mid-plane that passes through the centre of the cams 34.

The retaining washers 66, 68 thus provide relative axial retention of the inner 26 and outer 28 rings while at the same time being fixed to one of the rings and radially facing the shoulders 26e, 26f formed on the other ring. The washers 66, 68 and the shoulders 26e, 26f form means for the relative axial retention of the rings 26, 28.

In the embodiment illustrated, the retaining elements 66, 68 are fixed to the outer ring 28 and small clearances are left between the said washer and the inner ring 26. Of course, it will be readily appreciated that it is possible to reverse this arrangement. As an alternative, it is also possible to attach the washers 66, 68 to the outer ring 26 by any appropriate means other than clenching. However, clenching is particularly effective and economical.

The shoulders 28e, 28f of the outer ring 28 and the shoulders 26e, 26f of the inner ring 26 respectively delimit separate zones on the said rings, a central zone being designed to bear against the cams 34 and the plain bearings 52, 53, the other zones being associated with the retaining washers 66, 68. Axially between the retaining washers 66, 68 are the bearings 52 and 53, the cage 36, the spring 46 and the cams 34. The annular grooves in the outer ring 28 are located near the retaining washers 66, 68.

Seals 70, 72 are mounted inside the said grooves and rub via a lip against those zones of the exterior surface 26d of the inner ring 26 that are associated with the retaining washers 66, 68. The seal 70 is positioned radially between the inner 26 and outer 28 rings and mounted axially between the retaining washer 66 and the radial surfaces 26b, 28b. Similarly, the seal 72 is mounted radially between the rings 26, 28 and axially between the retaining washer 68 and the radial surfaces 26c, 28c. The seals 70, 72 hold in the grease with which the module 24 was initially packed so that the disengageable module 24 thereafter becomes self-lubricating requiring no maintenance, no supply and no removal of lubricant, thus considerably simplifying its structure. The grease is used mainly to lubricate the plain bearings 52, 53 and the free wheel 30.

The effectiveness of the seals 70, 72 is further enhanced by the retaining washers 66, 68 which form labyrinths with narrow passages with the inner ring 26, thus ensuring excellent sealing between the free wheel 30 and the external surroundings. This also helps to keep lubricant, in this instance grease, between the bearings 52, 53 and, particularly, inside the free wheel 30, and prevents the ingress of external contaminants. Effective and permanent lubrication of the bearings 52, 53 and of the free wheel 30 can thus be ensured.

The elements of which the disengageable module 24 is made are thus positioned entirely radially and axially between the inner rings 26 and 28. This yields a module that is extremely compact, can be handled with ease without the risk of the elements of which it is made becoming disassembled, and fitted very easily, for example by simply pushing it into the ring gear 22 and onto the crankshaft 12.

Referring once again to FIG. 1, there is a lip seal 74 the lips of which rub radially between the crankcase 16 and the crankshaft 12 in order to keep engine oil inside the said crankcase. The seal 74 depicted here is a seal that has two lips. Of course, it is just as possible to provide a seal with just one lip or alternatively to provide some other kind of seal.

The way in which the transmission system 10 works is as follows. When the electric starter motor 18 turns the ring gear 22, this turns the crankshaft 12 via the disengageable module 24. The outer ring 28 is therefore able to move, causing the cams 34 to pivot in a first direction of rotation to make them lock between the raceways of the inner 26 and outer 28 rings. The inner ring 26 is therefore turned and transmits the starting torque from the motor 18 to the crankshaft 12. As soon as the combustion engine has started, the angular velocity of the ring gear 22 drops below that of the crankshaft 12 and the cams 34 tend to pivot in a second direction of rotation the opposite of the first, thus causing them to become unlocked or unwedged. The free wheel 30 of the disengageable module 24 therefore no longer transmits any torque between the ring gear 22 and the crankshaft 12. The free wheel 30 of the disengageable module therefore provides a one-way coupling between the crankshaft 12 and the ring gear 22.

Figure 3:
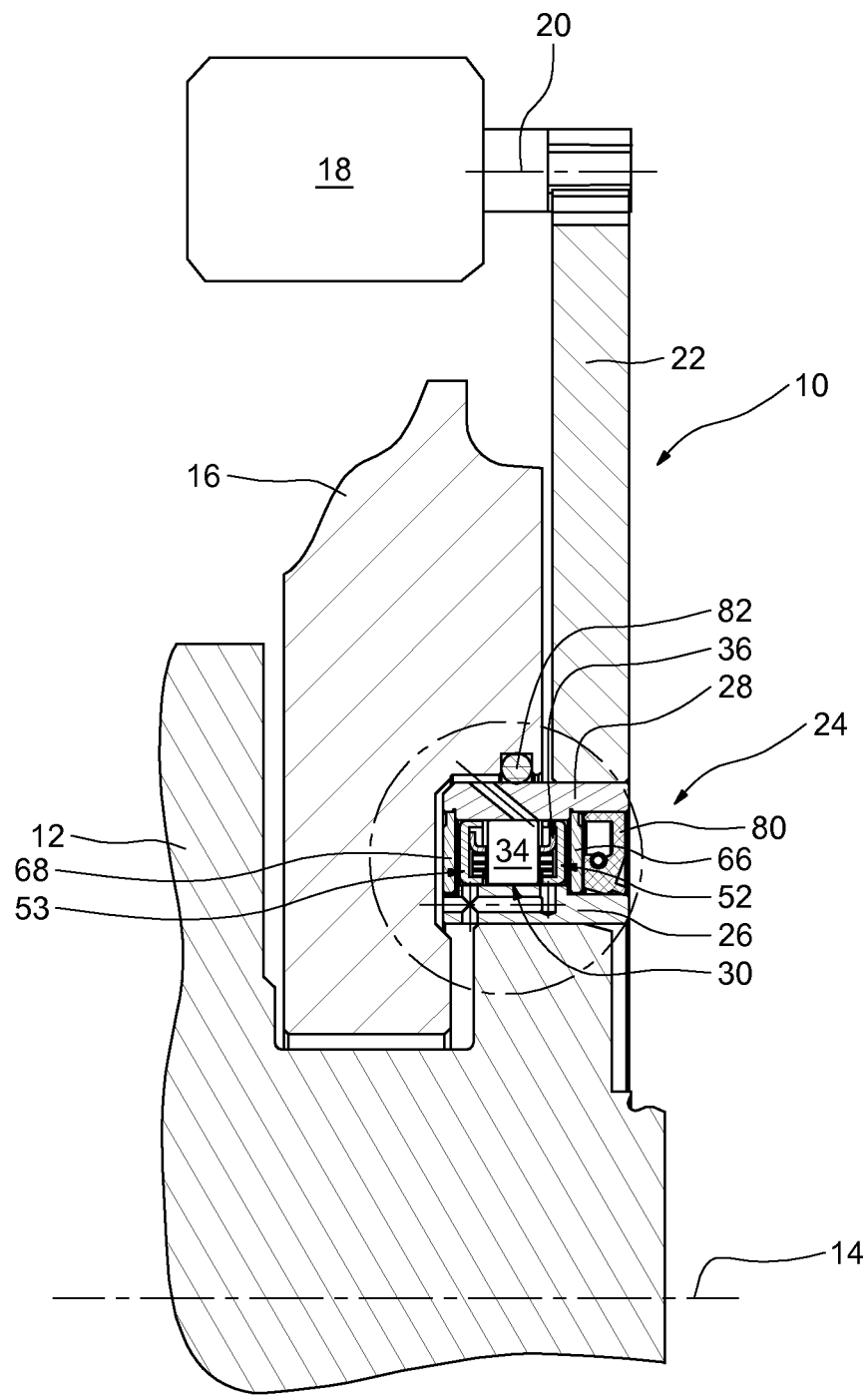
FIG. 3 is a part sectional view of a system for transmitting a starting torque according to a second embodiment of the invention.
Figure 4:
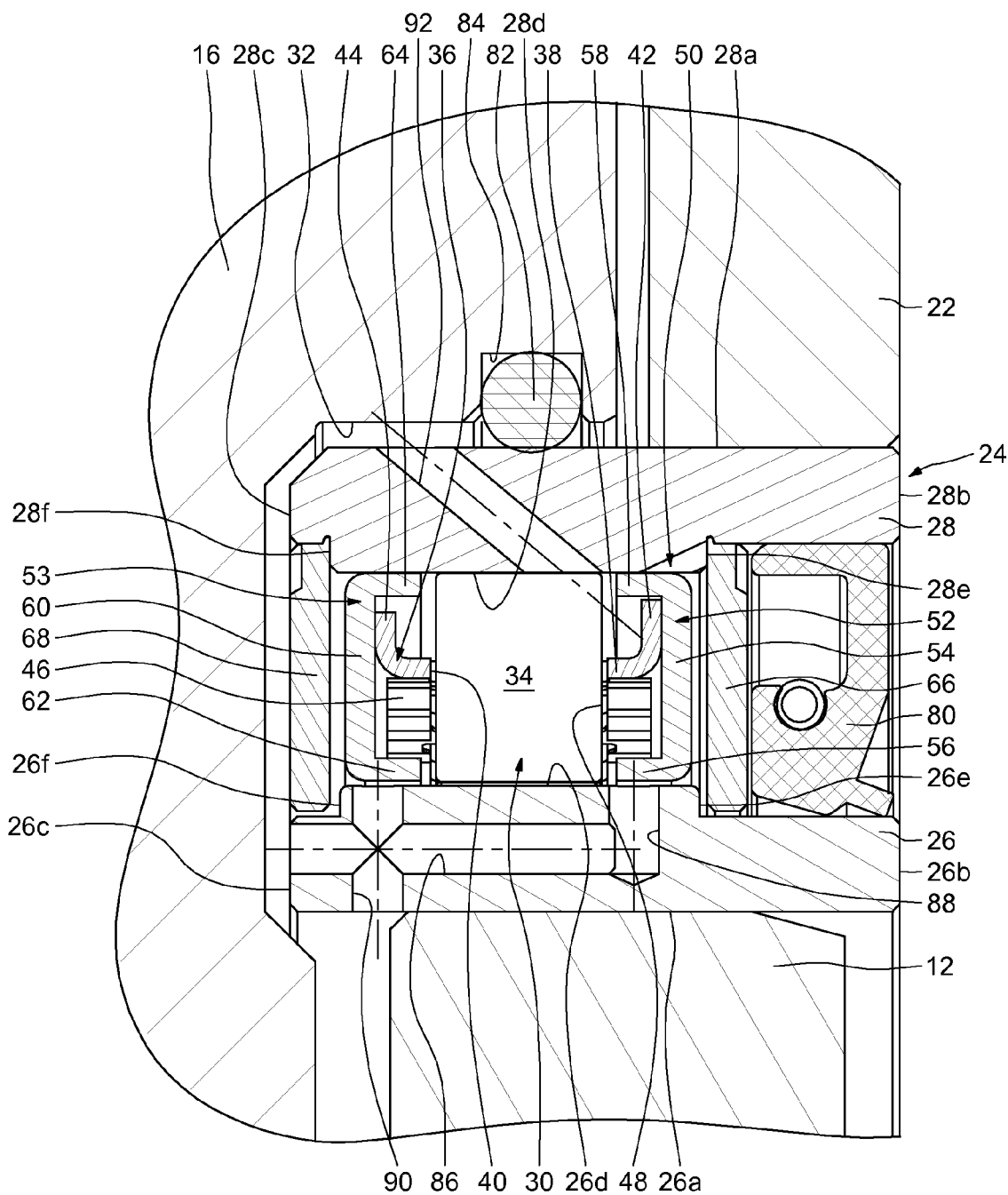
FIG. 4 is a detail of FIG. 3.

The embodiment illustrated in FIGS. 3 and 4, in which identical elements bear the same references, differs chiefly in that the disengageable module 24 is designed to be lubricated using internal combustion engine oil.

For that purpose, the disengageable module 24 does not have the seals 70, 72 described in the first embodiment. The axial distance separating the radial surfaces 26c, 28c of the rings 26, 28 and the plain bearing 53 is reduced so that the surface of the retaining washer 68 that faces outwards is more or less aligned with the said surfaces 26c, 28c. Axially, on the opposite side to the retaining washer 68 when considering the free wheel 30, the inner 26 and outer 28 rings have an axial dimension that is slightly increased so as to house a seal 80 of the same kind as the seal 74 used in the embodiment of FIGS. 1 and 2. The seal 80 is positioned axially in close proximity to the retaining washer 66. It is mounted radially between the inner 26 and outer 28 rings and axially between the said retaining washer 66 and the radial surfaces 26b, 28b of the rings 26, 28. There is also, in this instance, an annular seal 82 positioned between the crankcase 16 and the outer ring 28. More specifically, the seal 82 is mounted inside a housing 84 of the crankcase and bears against the outer surface 28a of the outer ring 28 in such a way as to prevent oil from leaking to the outside.

In order to supply the plain bearings 52, 53 and the free wheel 30 with the oil used in the internal combustion engine, oil ducts 86 to 90 and 92 are formed respectively on the inner ring 26 and the outer ring 28. The oil duct 86 runs axially inside the ring 26 from the radial surface 26c and is connected to the secondary oil ducts 88, 90 running radially in the said ring and opening onto the outer cylindrical surface 26d at the large-diameter zone against which the cams 34 rest. The oil duct 92 in the outer ring 28 is, for its part, angled and opens onto the bore 28d of the ring 28. The axial spaces between the crankcase 16 and the crankshaft and the radial space left between the said crankcase and the outer ring 28 allow oil from the engine to flow to the oil ducts 86 to 92 which then carry the said oil into the disengageable module 24. In this embodiment, the disengageable module 24, via the seals 80, 82, provides sealing between the inside of the crankcase 16 that contains the engine oil, and the external surroundings.

The invention therefore provides a module that is extremely compact both axially and radially, can be handled with ease without the risk of the elements of which it is made becoming disassembled, and can easily be fitted into the ring gear and onto the crankshaft. Furthermore, once the module has been fitted, there is no need to anticipate mounting additional elements for transmitting a torque between the ring gear and the crankshaft or for reacting radial load.

The invention claimed is:

1. A disengageable module for a system for transmitting a starting torque to an internal combustion engine, the system including a ring gear connected to the crankshaft of the combustion engine, the module comprising:
an inner ring configured to couple with the crankshaft and having a raceway,
an outer ring configured to couple with the ring gear and having a raceway, and
at least one free wheel having a plurality of wedging elements mounted between the raceways of the inner and outer rings, and
means for centering the inner ring and the outer ring relative to each other and for transmitting radial loading, the centering and transmitting means being mounted at least partially between the inner ring and the outer ring such that radial clearances are defined between the means and the inner ring.

2. The module according to claim 1, wherein the centering and transmitting means include at least one plain bearing positioned radially between the raceways of the inner ring and of the outer ring.

3. The module according to claim 1 wherein the centering and transmitting means are mounted axially on each side of the wedging elements.

4. The module according to claim 1, further comprising axial-retention means for axially retaining the inner ring relative to the outer ring.

5. The module according to claim 4, wherein at least one of the inner and outer rings has seating surfaces and the axial-retention means include washers fixed to the seating faces of one of the inner and outer rings.

6. The module according to claim 5, wherein the axial-retention means include shoulders formed on the other one of the inner and outer rings, the shoulders facing the washers.

7. The module according to claim 1, wherein the wedging elements are cams.

8. The module according to claim 1, further comprising a cage configured to maintain a circumferential spacing between the wedging elements.

9. The module according to claim 1, wherein each of the inner and outer rings has seating faces and the module further comprises at least one seal positioned radially between the seating faces of the inner ring and of the outer ring.

10. The module according to claim 1, wherein one of the inner ring and the outer ring includes at least one lubricant-feed duct.

11. The module according to claim 1, wherein the means for centering the inner ring and the outer ring relative to each other and for transmitting radial loading provide the radial centering of the inner ring relative to the outer ring.

12. A system for transmitting a starting torque to an internal combustion engine of a motor vehicle, the engine having a crankshaft, the system comprising:
   a starter motor,
   a ring gear connected to the starter motor and to the engine crankshaft, and
   a disengageable module including:
      an inner ring configured to couple with the crankshaft and having a raceway,
      an outer ring configured to couple with the ring gear and having a raceway, and
      at least one free wheel having a plurality of wedging elements mounted between the raceways of the inner and outer rings, and
      means for centering the inner ring and the outer ring relative to each other and for transmitting radial loading, the centering and transmitting means being mounted at least partially between the inner ring and the outer ring such that radial clearances are defined between the means and the inner ring.

13. The system according to claim 12, wherein the disengageable module is lubricated using grease.

14. The system according to claim 12, wherein the disengageable module is lubricated with internal combustion engine oil, the module being at least partially positioned in a recess of the crankcase.

15. The system according to claim 14, wherein the disengageable module further includes at least one seal positioned between the crankcase and the module and at least one seal positioned between the outer ring and the inner ring of the module.

16. A disengageable module for a system for transmitting a starting torque to an internal combustion engine, the system including a ring gear connected to the crankshaft of the combustion engine, the module comprising:
   an inner ring configured to couple with the crankshaft and having a raceway,
   an outer ring configured to couple with the ring gear and having a raceway, and
   at least one free wheel having a plurality of wedging elements mounted between the raceways of the inner and outer rings, and
   at least one bearing positioned radially between the raceway of the inner ring and the raceway of the outer ring and configured to center the inner ring relative to the outer ring and to transmit radial loads, wherein the at least one bearing is spaced from the inner ring by a gap.

17. The module according to claim 16 wherein the at least one bearing comprise first and second plain bearings mounted axially on each side of the plurality of wedging elements.

18. The module according to claim 17, further including a washer fixed to a seating face of one of the inner and outer rings for axially retaining the at least one bearing.

* * * * *